(12) United States Patent
Paraskevakos et al.

(10) Patent No.: US 7,940,901 B2
(45) Date of Patent: May 10, 2011

(54) REMOTE MANAGEMENT OF PRODUCTS AND SERVICES

(76) Inventors: Theodore George Paraskevakos, Towson, MD (US); Pavlos Kastrinakis, Athens (GR)

( * ) Notice: Subject to any disclaimer, the term of this patent is extended or adjusted under 35 U.S.C. 154(b) by 538 days.

(21) Appl. No.: 10/588,649

(22) PCT Filed: Nov. 5, 2004

(86) PCT No.: PCT/GR2004/000054
§ 371 (c)(1),
(2), (4) Date: Mar. 28, 2007

(87) PCT Pub. No.: WO2005/045716
PCT Pub. Date: May 19, 2005

(65) Prior Publication Data
US 2007/0258574 A1    Nov. 8, 2007

(30) Foreign Application Priority Data
Nov. 6, 2003 (GR) .................................. 030100456

(51) Int. Cl.
*H04M 11/00* (2006.01)
(52) U.S. Cl. ......... 379/106.01; 379/106.03; 379/106.04; 379/106.06; 379/106.07
(58) Field of Classification Search .......... 379/106–107, 379/201–203, 207; 340/870.02–870.03, 340/310; 364/483, 481, 550, 551
See application file for complete search history.

(56) References Cited

U.S. PATENT DOCUMENTS

| | | | |
|---|---|---|---|
| 3,727,003 A | 4/1973 | Paraskevakos | |
| 3,812,296 A | 5/1974 | Paraskevakos | |
| 3,842,208 A | 10/1974 | Paraskevakos | |
| 4,241,237 A | 12/1980 | Paraskevakos et al. | |
| 4,455,453 A | 6/1984 | Parasekvakos et al. | |
| 4,833,618 A * | 5/1989 | Verma et al. | 702/62 |
| 5,161,182 A * | 11/1992 | Merriam et al. | 379/106.07 |
| 5,197,095 A * | 3/1993 | Bonnet et al. | 379/106.07 |
| 5,252,967 A * | 10/1993 | Brennan et al. | 340/870.02 |
| 5,434,911 A * | 7/1995 | Gray et al. | 379/106.06 |
| 5,559,894 A * | 9/1996 | Lubliner et al. | 382/100 |
| 5,590,179 A * | 12/1996 | Shincovich et al. | 379/106.06 |
| 5,959,549 A * | 9/1999 | Synesiou et al. | 340/870.02 |
| 6,208,266 B1 * | 3/2001 | Lyons et al. | 340/870.02 |
| 6,246,677 B1 * | 6/2001 | Nap et al. | 370/346 |
| 6,304,191 B1 | 10/2001 | Campbell et al. | 340/870.14 |
| 6,646,731 B2 * | 11/2003 | Wolleswinkel | 356/138 |
| 6,842,706 B1 * | 1/2005 | Baraty | 702/61 |
| 2002/0018545 A1 * | 2/2002 | Crichlow | 379/106.03 |
| 2002/0193144 A1 * | 12/2002 | Belski et al. | 455/557 |

FOREIGN PATENT DOCUMENTS
CA    938363    12/1973
(Continued)

*Primary Examiner* — Lana N Le
*Assistant Examiner* — Phung-Hoang J Nguyen
(74) *Attorney, Agent, or Firm* — Drinker Biddle & Reath LLP

(57) ABSTRACT

The present integrated system—method and remote management devices for services and products that are mainly provided by public utility companies, is primarily based on monitoring the consumption of the product. Both the organisation as well as the clients are provided with information (by means of specialised software) regarding the improved management of the products and services of the organisation and the more rational pricing. The consumers are given the chance to contribute to the saving of energy in a substantial manner, thus contributing to reduced environmental pollution. Other system features include the issuance and settlement of invoices, as well as other services such as tele-statistics, tele-marketing, tele-polling, etc.

81 Claims, 12 Drawing Sheets

FOREIGN PATENT DOCUMENTS

| | | |
|---|---|---|
| DE | 199 62 954 | 6/2001 |
| GB | 1362411 | 8/1974 |
| GB | 1362412 | 8/1974 |
| WO | 02/46852 | 6/2002 |

* cited by examiner

REMOTE MANAGEMENT OF PRODUCTS AND SERVICES

The present invention suggests a remote product management method and system for use in public and private organisations providing public utility products and services, hereinafter referred to as "PUOs" (Public Utility Organisations) for brevity, aiming at the enhancement of the production and disposition of their products and the more rational pricing of these products. The invention concerns PUOs, such as electric power, water, natural gas, gas, heating, etc., production and distribution companies, among others.

So far, the scheduling and production control of these products has been based on an approximate estimate of consumptions. Correspondingly, pricing is based on on-site readings and the approximate evaluation of the data collected. Client-consumer charging is effected by approximation and it is not always fair, leading to some clients paying more than they should.

PUO clients were, and still are the "victims" of this lack of scientifically substantiated data on the part of the PUOs, while at the same time they are not given the right to influence the charging imposed by a more rational management of the service received based on data produced solely on the basis of their consumption.

That is to say the client has no right on the substantial management of the product received, he may not influence this product (e.g. economize or avoid excessive consumption) and he has no other choice than to accept pathetically what the PUO states to be his consumption.

Naturally, the present situation is due to the inability of past technology (as the one that was originally installed) to provide reliable information of individualized consumption at low cost, thus obliging PUOs to proceed with general estimates, mean values and the mass and impersonal treatment of their clients.

Modern changes in the organisation of PUOs, such as the privatisations, the abolition of monopoly, the right to produce and sell products—such as electric power—given to third parties and the development of ecological awareness on the part of consumers render the adoption of certain drastic changes imperative for the entire system.

The present invention is based on numerous older Inventions, for which patents I (T. G. Paraskevakos) have been awarded both in Greece as well as abroad. Indicatively:

Gr. Patent 45068 of Jun. 15$^{th}$-1972 with the title "Μέθοδος αυτόματου Τηλεφωνικής αναγγελίας επειγούσης καταστάσεως. (Method of automatically dispatching emergencies by telephone).

U.S. Pat. No. 3,842,208/15-Oct.-1974 <<Sensor monitoring Device>>

U.S. Pat. No. 4,241,237/23-Dec.-1980 <<Apparatus and method for remote sensor monitoring, metering and control>>

U.S. Pat. No. 4,455,453/19-Jan.-1984 <<Apparatus and method for remote sensor monitoring, metering and control>>

The main characteristic of the above patents was the exchange of information through telephone lines that was based on the following prior inventions:

Gr. Patent 37733 of 8-Jul.-1969 with the title "Μέθοδος αυτόματου δια ρευματοπαλμών μεταβιβάσεως των χαρακτηριοτικών στοιχείων της καλούσης Τηλεφωνικής συσκευής και αυτομάτως παρουσιάσης αυτών εις την Τηλεφωνικήν συσκευήν του καλουμένου εν τη αυτόματη αστική και υπεραστική Τηλεφωνία". (Method of automatically transferring by electric pulses the Identification of calling telephone device and automatically displays them in the called telephone side in automatic urban and long distance).

Gr. Patent 39092 of 10-Feb.-1970, as an addition to the previous Patent 37733

Gr. Patent 43263 of 11-Oct.-1971 with the title <<Μέθοδος αυτόματου ενδείξεων των διακριτικών στοιχείων της καλούσης και αυτόματος παρουσιάσης αυτών εις την Τηλεφωνικήν συσκευήν του καλουμένου όταν η γραμμή του καλουμένου είναι ελευθέρα ή κατειλημμένη εν τη αυτόματη αστική και υπεραστική Τηλεφωνία>>. (Method of automatically transferring by electric pulses the identification of calling telephone device and automatically displays them in the called telephone side in automatic urban and long distance telephony).

Gr. Patent 40176 of 23-Sep.-1969 with the title <<Αυτόματων μηχανισμών ενδείξεων των διακριτικών στοιχείων της καλούσης Τηλεφωνικής συσκευής εις την καλουμένην αντιστοίχως τοιαύτην>>. (Apparatus for decoding and display the identification of calling telephones device in the called one).

Gr. Patent 42452 of 10-May-1971 with the title <<Αυτόματων μηχανισμών ενδείξεων των διακριτικών στοιχείων της καλούσης Τηλεφωνικής συσκευής εις την καλουμένην αντιστοίχως τοιαύτην>>. (Apparatus for decoding and display the identification of calling telephones device in the called one).

In addition:

U.S. Pat. No. 3,727,003/10-Apr.-1973 <<Decoding and Display Apparatus for Groups of Pulse Trains>>

U.S. Pat. No. 3,812,296/21-May-1974 <<Apparatus for generating and transmitting digital information>>

Great Britain Patent 1,362,411/4-Dec.-1974 <<Apparatus for decoding and display of digital information>> and Patent 1,362,412/4-Dec.-1974 <<Pulse train generating and selection apparatus>>

France: Patent 71,133,237/24-Nov.-1972 <<Procede et apparell pour enregistrer la numero du poste telephonigue dont un appel provient>> and Patent 7132207/4-Jan.-1974 <<Appareil perfecinne de production et de tranmission d'information numerigue>>.

Italy: Patent 935035/1-Dec.-1972 <<Apparato perfezionato per generare e trasmettere informazioni numeriche>>.

Canada: P 938363/11-Dec.-1973 <<Decoding and display apparatus>>

South Africa: P 71/3894/3-May-1972 <<Improved apparatus for generating and transmitting digital information>>.

The widespread application (almost worldwide) of the call identification system and the remote metering systems have given us the opportunity to study the advantages and disadvantages of these systems as well as potential defects, to correct and to adapt them to the present technology and to propose the solutions of the present invention.

For brevity, the analysis of the present invention will be focused on electric power and water supply production companies, without excluding the application of the system to other PUOs that were mentioned in the above.

The more rational charging of the clients of an electric power production and distribution company requires the availability of high accuracy consumption curves for each client. Additionally, given that a company may be forced to purchase power by third parties due to either the prevailing conditions or the lack of production capacity, the detailed power market curves are equally essential.

It is a known fact that the cost of power is floating, depending on production time and conditions. It is also a known fact that the power produced may not be stored. Naturally, all the surplus power produced in order to cover the mean consumption requirements is lost, thrown away, regardless of whether it is disposed of or not. This amount of power translates into added cost for the company for production or purchasing and this relative cost is transferred to the consumer.

The more frequent metering of consumptions could lead the Power Company (P.C.) to a more rational production schedule. On condition that the system becomes widely used, the P.C. will be able to raise the main load percentage above the present percentage which is approximately 80%, depending on the factory, the country, etc. In addition, by avoiding consumption peaks, the company will be able to make more effective use of the production units and possibly avoid the need for creation of new units, which would in most cases be undesirable due to the surcharge entailed for the environment.

At present, given the use of electromechanical power meters in most cases, the collection of consumption data correlated with the time factor is rather difficult. Given that an acceptable detailed power consumption curve for customers should be based on hourly readings as a minimum, the P.C. would have to either install 24 separate meters for each consumer or have an employee assigned with the task of collecting readings by making hourly visits in order to record the corresponding meter reading.

This very disadvantage associated with electromechanical meters used at present is one of the many obstacles that his new invention is being called to surmount.

As demonstrated in the following figures, the method and the system proposed preserves the use of the electromechanical meter, while at the same time adding a sensor that counts the revolutions of the meter disc. With the help of a microprocessor that is also installed either within or outside the meter, it is possible to collect readings at fixed intervals, the number of which could practically be unlimited. In order to save time, it is proposed that consumption readings are recorded every one hour.

These readings are stored to the memory of the microprocessor in a coded format and they are transferred with the use of power line carriers to an apparatus installed at a suitable location within the house of the consumer, through the respective power supply line. In the example given, the outer part of this apparatus resembles to a common telephone apparatus that is properly configured. This is why in the present description, the apparatus in question will be referred to as "Communicator" (1).

The codified consumption readings that are transferred by means of the power line carriers are decoded and stored to the specially configured memory of the "Communicator" (1).

Depending on the program selected, the "Communicator" (1) checks whether the customer's line is free at fixed intervals. If it is, the Communicator contacts the P.C. through the Internet and sends the hourly consumption readings that have been stored into the meter.

Using these data, the P.C. may draft consumption curves for the client in order to form a profile that will be used for the creation of a more generic consumption curve, starting from small groups. This consumption curve may subsequently be expanded so as to encompass other substations and production units of the P.C.

Special software programs have been compiled that facilitate the handling of data. From this point on, the P.C. may rely on the knowledge of these consumption load curves in order to draft the price list with more than the two charging zones currently used, thus offering the client the ability to select the period of consumption and differentiating the respective pricing policy.

One of the installed advantages of the "Communicator" (1) is that it may display on screen the kilowatt hour (kwh) (42) sale price in effect at any given time and provide the client with feedback, as explained further down, so that they may adjust the respective consumption and select more economical zones for the operation of electrical appliances or other consumptions.

The ability of bidirectional communication of the "Communicator" (1) with the P.C. through the Internet, allows the P.C. to enforce a consumption restriction, imposing an extremely high consumption rate on its customers and thus indirectly obliging them to cut back on consumption—particularly useful in such cases as periods of heat wave, when all air-conditioning units are on—so that the power network may not brown out.

The above process is rather reasonable, given that in order to provide the additional power required, the P.C. is obliged to either operate specialized production units (gas turbines), or purchase power from third parties, with both alternatives leading to increased cost for the P.C. Therefore, it would only strike as reasonable and fair for the company to charge in proportion with the price of purchase or the cost of production of the additional power.

The indicative example described, also proposes the installation of a special system at the consumer's safety switches, so that with the application of a specific software program, the P.C. will be able to interrupt the operation of electrical appliances from a distance, e.g. water-heater or any other consumption that is deemed important and has been agreed with the consumer in advance.

It is self explanatory that the presence of a microprocessor at the "Communicator" (1), provides the latter with special properties and abilities. This microprocessor may be suitably programmed, so as to automatically adjust the customer's total consumption depending on the time, namely, the microprocessor program will be able to interfere with certain electrical appliances of the consumer and on condition that a specified set of conditions are met, e.g. consumption exceeds a predetermined "limit" for one specific hour of the day. This limit may be determined in advance. However, the ability of bidirectional communication with the P.C. offers the latter the ability to modify the limit in case of emergency. In other words, the consumer's limit may be 5 kW for the period between 11-12 noon and if the consumption is greater than the limit, the system will be able to act automatically, interrupting certain supplies, such as the supply of the water heater, or the system may activate a rather luminous indication at the "Communicator" and warn the consumer that he must chose the electrical appliances that he must deactivate, because the cost of consumption is excessive. The electric power production and distribution company may modify the "limit" under particularly urgent conditions, so as to avoid brown outs. This may be done either through the Internet or over the phone.

If the electric company calls the "Communicator", then the "Communicator" will recognise the number of the caller and the incoming call signal will not be sounded, so a to not disturb the customer. In this case, a rather intense signal e.g. a red LED with pulsating light will be activated, e.g. a red LED, so as to attract the attention of the consumer and suggest that they limit consumption, in order to avoid excessively high chargers. At the same time, the electric power production surge will also be avoided. The equalisation of the consumption peak will also be helpful with reference to a program that will select the hours of operation of the electrical appliances, on the basis of the lower charge.

Obviously, the provision of such services presupposes the existence of a new legal framework and the change of regulations. The present invention does not deal with the legal framework, yet it offers technical solutions that may lead to this change of regulations, if such changes are desired.

A further innovation associated with the present invention is that care has been given so that no new wired installations are required, which would render the application of the system financially inexpedient.

As shown in the attached drawings, communication between the meter (23) and the "Communicator" is effected through the power transmission line (19). Furthermore, the transmission of information and commands from the "Communicator" to the safety switches (13) is also effected through the power transmission lines (10, 11).

The "Communicator" may be connected to the Internet through a wired telephone line, mobile telephony, a fibre optic network, cable television or a satellite connection or any other way that will be deemed suitable either at present or in the future.

The system "Communicator" could be installed at the residence or the office of each consumer, or it could even be installed at the centre of a property, so as to service more than one meters. Namely, in the case of multiple residences (blocks of flats), the "Communicator" could be installed close to the electric power meters and receive signals from numerous meters. The "Communicator" may then receive these messages, process them and act accordingly.

Naturally, the "Communicator" will be installed in one of the three phases of the system, although it will still be able to receive messages by the meters installed on other phases as well, by means of wireless communication between the meter microprocessor and the "Communicator" microprocessor, as explained further down. The use of radio communication between the meter and the "Communicator" allows the "Communicator" to receive messages by the remaining phases as well. This has not been possible so far when power line carriers were being used. The "Communicator" may also receive signals by other types of meters as well, e.g. natural gas (25), water (24), steam (26), etc.

This "Communicator" could be installed at the entrance of a block of flats, have the shape and use of a common telephone (card phone-payphone) and be able to service all tenants of the block as follows: each tenant will have their own access code (pin), by which they will be able to monitor their consumption on the "Communicator" (36) screen at any given time. Furthermore, they will also be able to pay their power bill (41), following a predetermined paying process and receiving a printed payment receipt on condition that the "Communicator" is connected to a printer.

The collection of data from the meters will be possible either with the process described above, namely automatically, or with the help of a suitable sensor installed at the meter, or manually by a meter reader using an optical recognition apparatus. In essence, this apparatus will photograph the meter reading, translate it through an optical character recognition (OCR) program and either store the data in the temporary memory or transmit it through mobile telephony, SMS, WAP (14) or any other means available.

The system may also make use of the latest developments in mobile telephony and adapt to the existing or future mobile telephony appliances that are equipped with an integrated or an add-on camera.

In this case, the specially modified cell phone (29) is installed outside the meter (23) with the camera (30) facing towards the meter screen (62), so that it may pick up the information displayed on screen at any time. Following the order issued by the electric power company or based of it's own program, the mobile telephony apparatus will photograph the meter display (62) with the use of the camera, convert the photograph to digital characters with the use of the optical recognition program (OCR) that will have been installed, and send the information (consumption reading) to the P.C. In this case, no particular memory will be required for metering the power consumption, given that the cell phone may read the mechanical memory, namely the meter screen (62). Also, due to the fact that the call is initiated on the part of the consumer, the caller number will also be the client number.

With this system, all the installations, unsealing operations and modifications of the meters are no longer required. The overall subsequent construction and processing is external and the electric company may easily transfer the system from meter to meter, so that the required data may be collected in order to elaborate studies and draft the consumption curves, without even having installed the system mentioned in the above. Obviously, the P.C. will receive the calls and then process the information, thus implementing a more rational pricing policy.

The camera (30) photographing the meter screen may be connected to a wireless communication system (18), such as a "Blue-tooth" or any other means, and it will send the readings that will previously have been processed by an optical character recognition program (OCR) to a nearby "Communicator". This same camera could also be used for the collection of information by other meters of this sort, such as water (24), gas (25) meters, etc., in which care will have been given for constant supply by a battery, whether rechargeable or not, photovoltaic or other systems that will be made available in the future.

The system will also provide the information associated with the consumption by the clients and the specific hours of consumption to the companies supplying, selling power to the company maintaining the network, so that they may also know how much power was actually consumed. This will assist in the more fair costing of the power the P.C. purchases by third parties.

As mentioned in the above, we have selected the power and water supply corporations in order to simplify the description. It is both understood as well as obvious to those having the knowledge required, that the present system could also be expanded to all the companies disposing of meters that are accessible by the consumers, such as water, gas, natural gas, heating companies, etc. In addition, the system could also be implemented by companies not disposing of meters that are accessible by the consumers, such as the telephone companies. In this case, the consumer will have the ability to read the account status at any time, accessing the "Communicator" (1) with the use of a special access code (pin). This may be initiated by reading the meter through the Internet.

The specific innovation of the present invention is that it allows the clients to check and possibly intervene to their consumptions at any time and calculate their expenses in advance, whether it is about a domestic consumption or a professional one.

Communication of the client with the PUOs through the "Communicator" (1) may be effected at the client's discretion, or automatically by a software program that will be installed to the client's personal computer (PC) at the house or the professional Installation or enterprise. This option is a very significant, since it allows the control over the cost of consumption.

DETAILED DESCRIPTION OF DRAWING AND SYSTEM OPERATION

Figure 1:
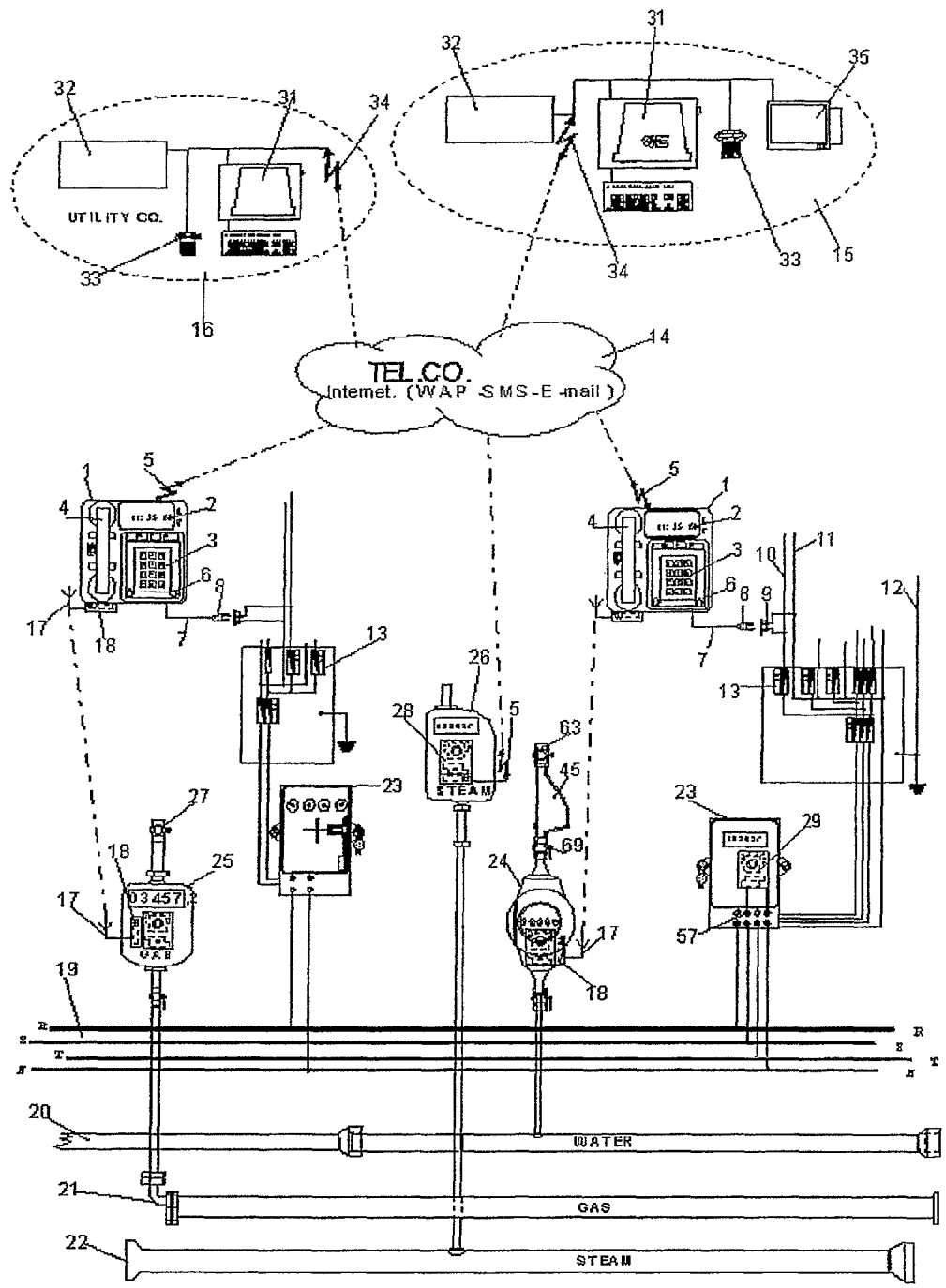
FIG. 1: An overview of the installation and the connection between the different devices and systems and the data processing offices (15, 16) through the telephone network (14).

FIG. 1: Indicative illustration of a typical arrangement of the entire system. In order to keep the description short, we have only installed two "Communicators" (1), which are connected to the telephone network (14) by means of the communication modules (5) and communicate with the data monitoring and processing units (15) and (16). The "Communicator" (1) is connected to the plug (8) and the socket (9) of lines (10) and (11) of the power supply network by means of the supply cable (7). After passing through the meter (23), the power supply network is connected to the power transfer lines (19) by means of the safety switches.

The meters (23) may actually be any type of typical single or three phase meters, or any other type that may be required for the operation of the installation. FIG. 1 also illustrates the gas meter (25), through which natural gas flows from the gas supply (21), the heat meter (26) which is connected to the steam supply line (22). The water meter (24) is connected to the water supply line (20) by means of a valve (69), allowing the circulation of water through the water manager (45) and the connection to the consumer's water supply circuit by means of the valve (63).

The meter readings (23) that are received by the sensors are transferred through the power supply line to the "Communicator" (1). This operation will be explained later.

The water meter (24) disposes of a photograph taking circuit (29) which uses a communication radio (18) and an antenna (17) in order to communicate with the "Communicator" (1) that also disposes of the same circuit, namely communication system (18) and antenna (17). This very circuit could be adapted to the gas meter (25), as illustrated in FIG. 1. Even the photograph taking system (28) could be connected to the telephone network (14), thus allowing the meter (26) to communicate directly with units (15) or (16) respectively.

It is obvious to those familiar with the technique, that the arrangement of the meters and the method of intercommunication may vary depending on the need and the object of the public utility product and service supply company.

The communication centres (15) mainly consist of a computer (31), which is connected to a server (32), a telephone device (33) and a plotter (35). The centre communicates with the communication unit by means of the telephone network. The communication link may be a wired or a wireless telephone line, or a fibre optic line, depending on the service requirements and the data volume that needs to be transferred.

The communication and processing unit (15) could either be a central computer unit collecting information from all the networks and servicing all the public utility companies, or a central computer unit (15) or even (16), that only services one public utility company.

The layouts, the equipment, the computers and the connections may vary depending on the needs and the number of clients to be serviced. Centres (15) and (16) may receive information over the Internet, or through a telephone connection, not necessarily a connection to the Internet, and they may send information to the "Communicators" (1) in the same way for the reasons and the cases that will be explained later.

Figure 2:
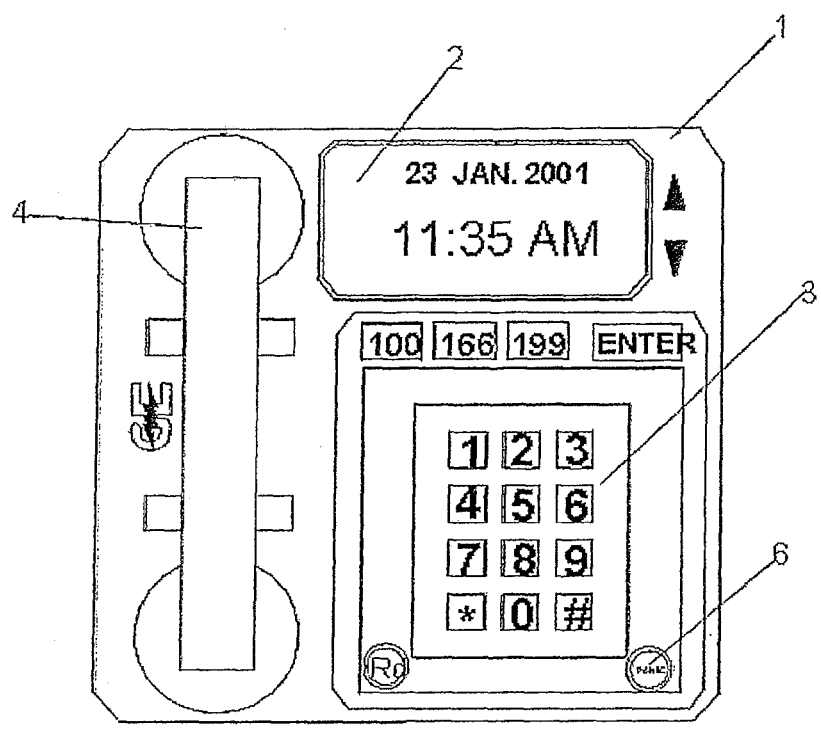
FIG. 2: Typical example of "Communicator" (1) Illustration.

FIG. 2: Illustration of a typical "Communicator" (1) arrangement, which resembles to a simple telephone device in the specific example. It disposes of a data display screen (2) that could be an LCD or a LED screen or any other type of screen that would constitute a suitable means of data presentation.

Figure 2A:
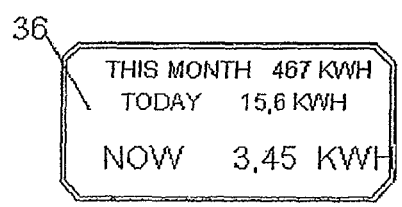
FIG. 2*a*: Typical "Communicator" (1) display referring to consumption indications.

The "Communicator" bears a typical keyboard (3), a typical receiver (4) and a number of specific keys (6). The display screen (2) may display the date and time, the number of the caller or the monthly, daily or current consumption (36), as shown in FIG. 2*a*.

Figure 2B:
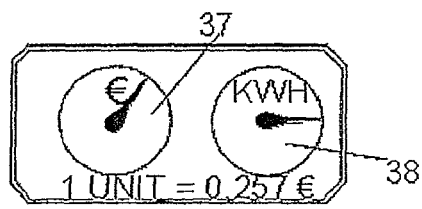
FIG. 2*b*: Typical "Communicator" (1) display graphically representing consumption in relation to price.

Depending on the system function, the screen (2) could also display the current cost of supply of the product or service (kWh) (38) in euros, dollars or any other currency (37), as in FIG. 2*b*.

Figure 2C:
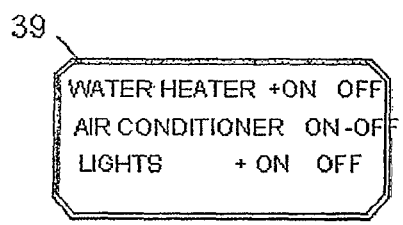
FIG. 2*c*: Typical "Communicator" (1) display Indicating the status of the electrical appliances of the consumer.

Another display option (2) is the presentation of the electrical circuit (39) status that will indicate the operational status of the circuit (on or off) for large consumption appliances, as in FIG. 2*c*.

Figure 2D:
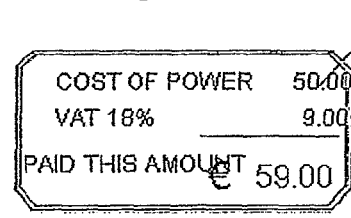
FIG. 2*d*: Typical "Communicator" (1) display illustrating the bill to be paid.
Figure 2E:
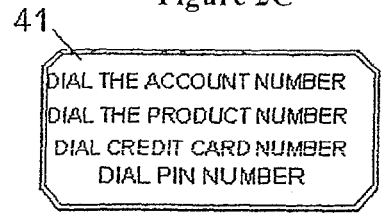
FIG. 2*e*: Typical "Communicator" (1) illustrating a remote payment process.

In FIG. 2*d*, the screen (2) displays a typical invoice to be collected (40) while in FIG. 2*e*, the screen displays the payment method selected for the invoice (41).

Figure 2F:
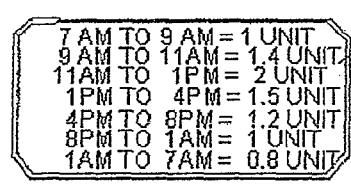
FIG. 2*f*: Typical "Communicator" display (1) stating prices as a function of time.

In a different function of the system, the screen (2) displays the power price list depending on the hour of the day (42), as shown in FIG. 2*f*.

It is obvious to those being familiar with the art that the screen (2) may also display product commercials, while the "Communicator" (1) may be used for televoting (polls), product telemarketing and many other purposes that are obvious to technique experts and will be skipped for brevity.

Figure 3:
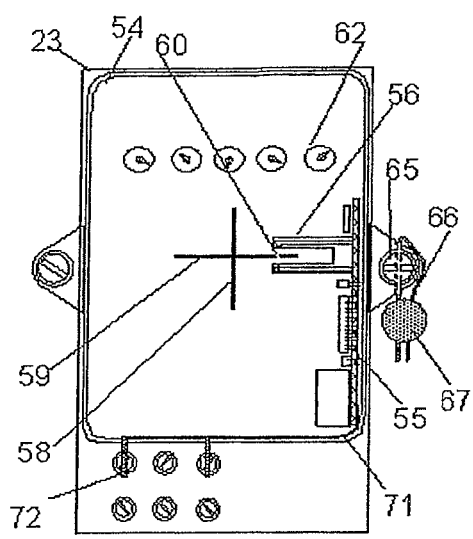
FIG. 3: Detailed illustration of the meter (23) in combination with the meter communication circuit (client) (55).

FIG. 3: This is a typical illustration of an electric meter (23) used merely as an example, with the addition of the meter communication circuit (client) (55) equipped with the electronic circuit of the sensor. With the help of the light switch (interrupter), the sensor records the revolutions of the disc

(59) that rotates around its own axis and disposes of an aperture (60), just like all other typical electric power meters. The light emitted by the LED of the light switch (56) passes through the aperture (60) thus causing the meter communication circuit (55) to record one pulse for every revolution of the disc, if the disc disposes of only one aperture (60). Otherwise, the circuit records one pulse for every aperture of the disc (60).

The supply of the meter communication circuit (client) (55) is effected through the line (71) leading to the contact bars (72), which in turn are in contact-connected with the power supply lines on the upper connection screws of the meter. The connection of the communication network of the meter (client) (55) may be effected in many ways. The connection suggested is merely typical and indicative.

The meter communication circuit (55) is located under the transparent cover of the meter (23) that we have selected for the example. In order to install the communication circuit (55), the wire (66) of the seal (67) will have to be ruptured in order to unscrew the special screw (65), remove the cover (54) and replace it with another that will bear the meter communication circuit (55) and the contact bars (72). This is to say that in order to transform a common meter to a meter equipped with a sensor and a communication circuit with the "Communicator" (1), you will need to replace the cover (54) with another bearing all the sensor components, and then to reseal the meter. It is obvious that the sensor may be replaced without opening the cover (54).

Figure 4:
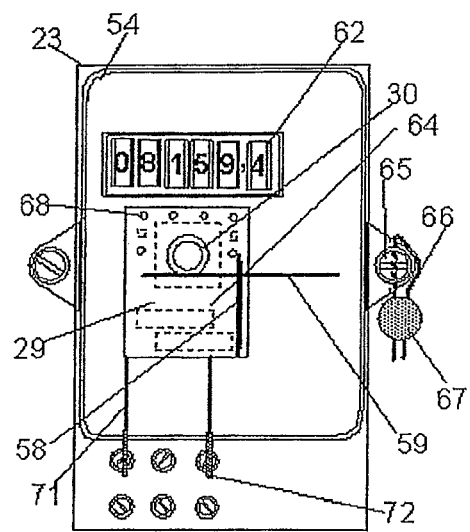
FIG. 4: Typical illustration of meter front (23) with the photograph taking device (29) installed.

FIG. 4: Illustration of a meter (23) equipped with a different type of sensor, disposing of a camera (30) which is attached to a special electronic circuit board (29).

Figure 4A:
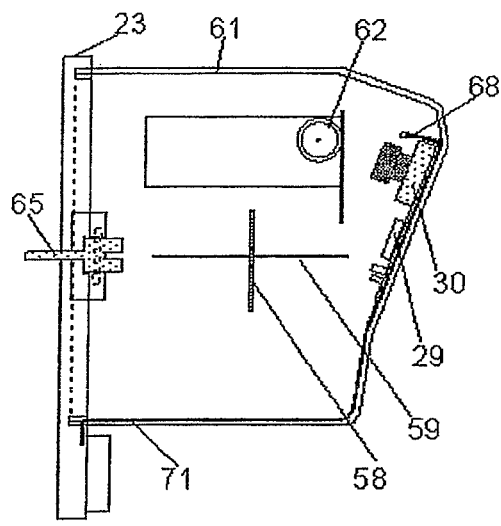
FIG. 4*a*: Lateral view of the meter (23) with specially formulated cover (61) for the installation of the photograph taking device (29).
Figure 4B:
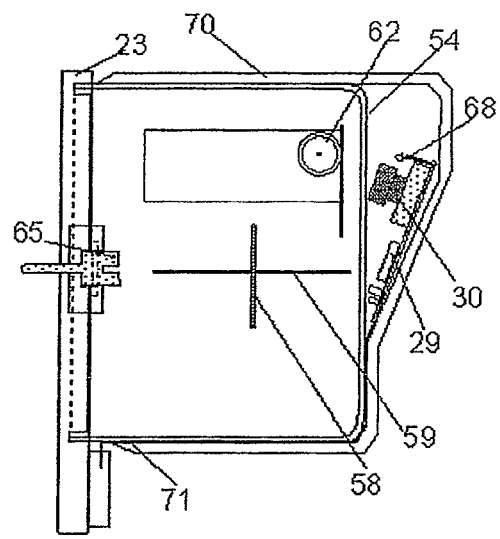
FIG. 4*b*: Lateral view of the meter (23) with the photograph taking device (29-30) installed to the exterior with the use of a special transparent protective cover (70).

The circuit is connected to the meter by means of contacts (72), as in FIG. 3. The camera (30) takes one photo of the screen (62) at fixed Intervals, either automatically or manually. In order for the photograph to be taken by the camera (30), the system illuminates the screen panel using the bulbs (68), in this case a number of LEDs. The camera (30) along with the board (29) and the LED (68) may be adapted to a different external cover (61), which will be specially formed so as to provide ample space for the components of the mechanism and will replace the cover (64), as shown in FIG. 4a. In case you don't want to unseal and rupture the seal (67) for any reason, then you may construct a transparent cover that will be installed over the meter (23) as shown in FIG. 4b. It is preferable that the transparent cover (70) is fixed onto the cover (54) In some way, such as the use of glue, screws or any other means that is deemed fit. Those familiar with the art know that the method of installation of the camera varies, just like the position of the camera. In the example under discussion, the camera has been set lower so as to not prohibit the consumer or the competent employee of the public utility company from reading the meter (62).

Figure 5:
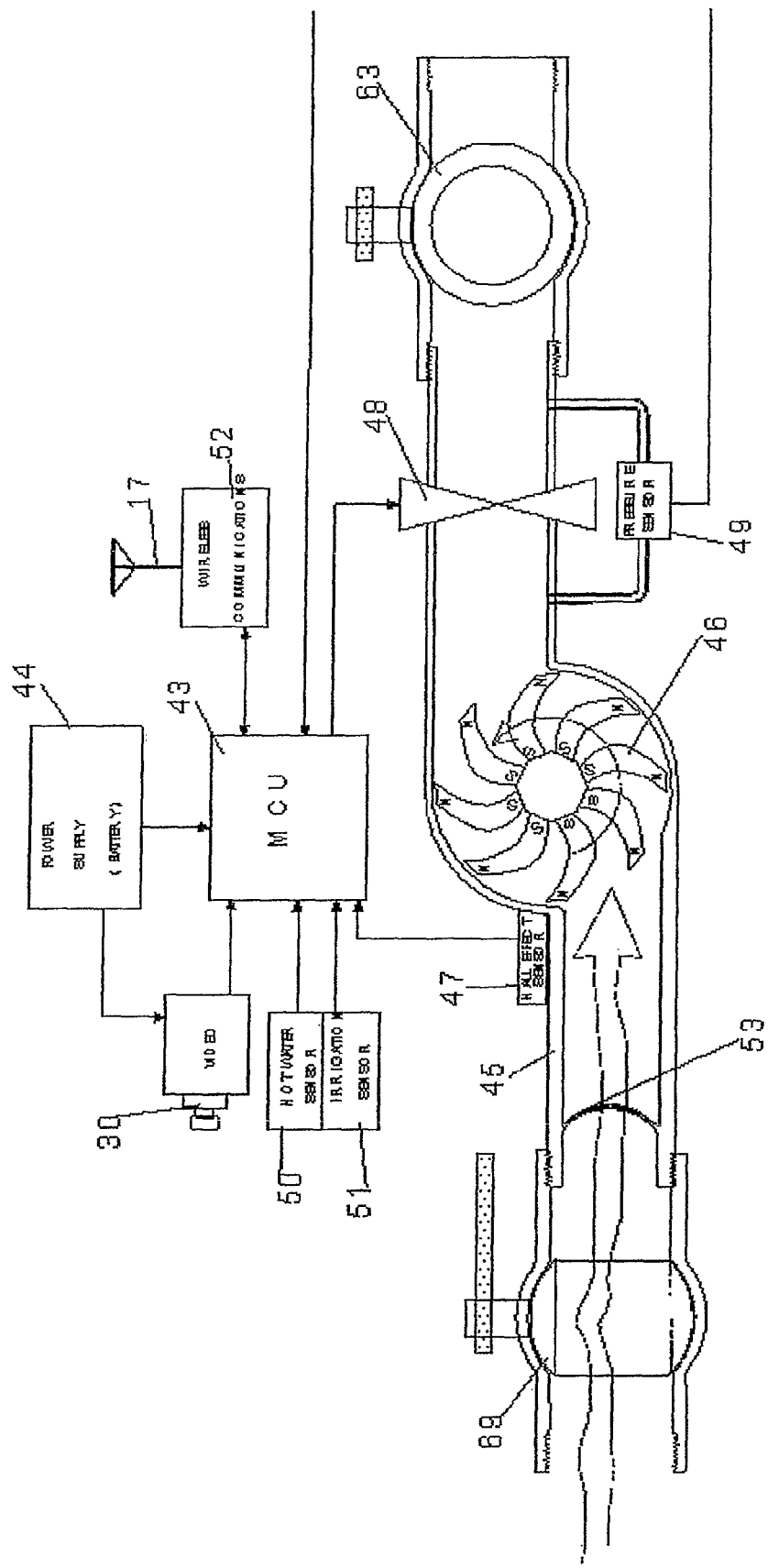
FIG. 5: Typical water supply and consumption regulation device with the required control connections.

FIG. 5: Illustration of a typical volume metering system that could be used for water, gas, steam or any other product the volume of which may be measured. In order to save time, the product used in this example is water. Water enters the appliance (45) through a filter (53) used for retaining solid particles. The water flow causes the wheel (46) (propeller) to revolve. The wheel (46) disposes of vanes made of magnetic material that are arranged so as to face in a specific direction. Namely, the South Pole at the centre and the North Pole at the ends (in the case of the specific example). In other words, each vane also constitutes an individual magnet.

During the revolution of the wheel (46), the magnets affect the sensor (47) which in this case is a Hall Effect sensor, although it could also be a reed switch or any other sensor that may be deemed fit now or in the future. The pulses collected by the sensor (47) are guided to the microprocessor (43) which in turn sends the processing result to the "Communicator" (1) by means of the communication circuit (52).

The same microprocessor (43) may be used for the connection of the hot water sensor (50), the irrigation sensor (51) and of course the camera (30), that would be able to take photographs of the meter screen that has been fitted to the system, namely water or gas or whatever else may be desired. The system is supplied by rechargeable or non-rechargeable batteries (44), by active means such as electric power supply or by passive means such as photovoltaic elements or any other means that may be deemed fit now or in the future. The motion of the product (in this case water, indicatively) causes the revolution of the wheel (46) thus leading to accurate metering of product consumption.

The public utility company managing the system will have the ability to interrupt the supply of the service upon its own discretion, using the "Communicator" (1) and the communication system (52). This means that the management company may impose consumption restrictions, namely, it will be able to allow a daily quantity of water per meter and actively control the consumption. The layout of FIG. 5 also offers the ability to have a controlled flow of water or any other product that will act as a consumption safety.

The presetting of the quantity of the product would contribute significantly to the proper management of the product, particularly in cases when the client has a special consumption rate for certain situations and hours, although he is obliged to discontinue the supply of the product under specific conditions imposed by the PUO.

For instance, a factory consuming large quantities of natural gas is supplied by the company with favourable terms. However, during the winter, when the temperature drops below a certain limit value and the domestic consumers use the natural gas for heating the specific consumer is obliged to interrupt the supply of gas and use a different type of fuel, e.g. crude oil.

Up until now, the interruption of supply was mainly based on the client's good faith who had the ability to disregard the above obligation due to financial or other reasons. The PUO thus suffered pressure drops followed by all the damages on a technical and a financial level.

With the implementation of the present invention, the PUO will be able to send a command-signal to the "Communicator" (1), that will in turn transfer it to the microprocessor through the unit (52). The microprocessor will then send the command to the electrically activated flow switch (48) so that the supply of gas gets interrupted. In this way, the PUO enforces the implementation of the agreements in effect between the company and the client, without having to rely upon the good will of the client. Naturally, special agreements may be arranged in such cases, that will not have an adverse effect on the client while at the same time giving the company the opportunity to allow the use of the product, charging the client with a different rate.

In the case of the application of the apparatus (45) in water supply networks, the microprocessor (43) may also be programmed to allow only limited quantities of water, namely it could be set so as to automatically interrupt the supply by means of an electric valve (48) if and when the predetermined quantity of water has flown through the system.

For instance, let us suppose that the microprocessor (43) has been programmed to allow up to 20 litres of water per use. When this quantity is exceeded, the microprocessor will send a shutting command to the electric valve (48), so that the client may be protected against uncontrolled leaks of water. So, if a pipe has been ruptured, the maximum quantity of water to be lost, will be the predetermined quantity and the client will not suffer the consequences of Incessant water leak. Namely, the property will not be flooded as is often the case at present. Once the consumer restores the damage or doses the water tap that was left open, the pressure sensor (49) will detect the end of the leak and send a signal to the microprocessor (43) so as to revoke the command sent to the electric valve (48) and return to the normal circulation of water for another 20 litres, as programmed.

If the client consumes less than 20 litres of water for cooking, watering, the washing machine, shower, etc., the microprocessor will go back to the initial consumption program and allow the client to draw another 20 litres. In other words, the system allows the circulation of water in portions of less than 20 litres per activation. In this way, the client may avoid the losses due to negligence or defects that may result during his absence due to rupturing of the pipes on account of cold weather and thus avoid the damages associated with flooding.

It is obvious to those familiar with the art, that the quantity of water may be regulated depending on the requirements of the client.

A hot water sensor (50) is connected to the microprocessor (43), so that the system does not discontinue the water supply when the client may comfortably be taking a shower. Thus the client runs no risk of being left in 'cold water'.

An irrigation sensor (51) may also be connected to the microprocessor (43), so that the microprocessor may proceed to different decisions concerning the quantity of water that will be allowed for irrigation, by means of specialised equipment.

It is self evident that the system may also dispose of bypass mechanisms, so that the user-consumer may exceed the preset dosage without further interruptions.

It is obvious to those familiar with the art that when the mechanism (45) is implemented in the case of natural gas, it could be programmed, so as to allow a range of consumptions starting from low to a higher consumption, depending on the requirements of the client. If the consumption is less than the minimum, namely there is a gas leak, or higher than the maximum, namely there is a ruptured pipe, the supply will be interrupted automatically. Since the system offers the ability of interrupting the supply of the product on the basis of set programs and scenarios, the overall arrangement may be used in a similar way as the electrical fuse, thus providing the clients with safety services against gas leak, etc.

It is obvious to those familiar with the art, that the system may be configured in such a way, that the client gets notified in case of exceed of the limits set, and a damage report is sent to the supplier of the product in order to proceed with further actions.

Figure 6:
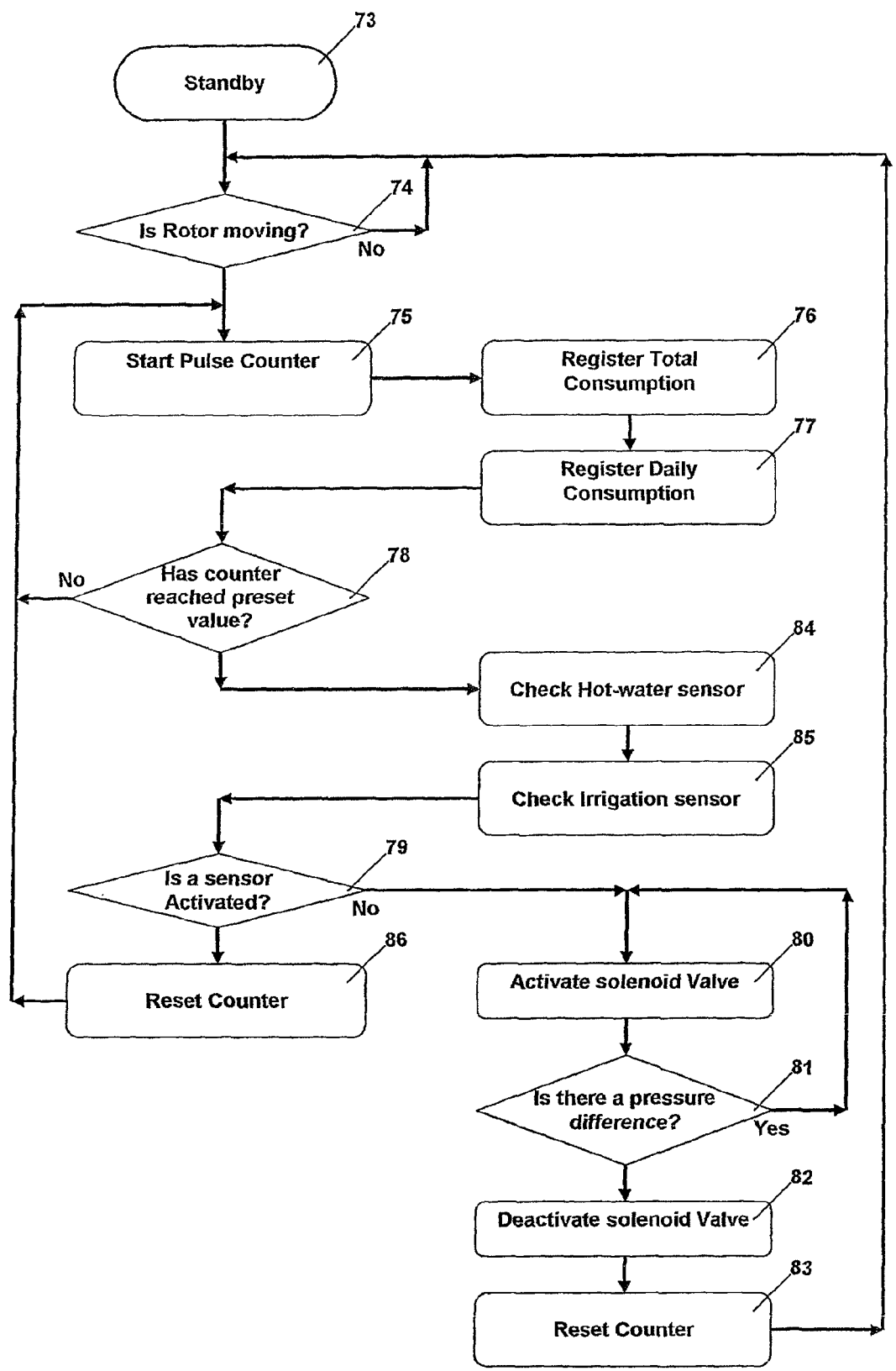
FIG. 6: Typical schematic of the flow chart for the water consumption management system of FIG. 5.

FIG. 6: Illustrates a typical and indicative sequence of the above system.

In this sequence, the microprocessor (43) is on standby mode (73) waiting for the propeller (46) to activate the sensor (47) and the system (74) to detect the movement of the propeller (46). Upon detection of the movement, an initial pulse (74) is recorded to the total (76) and daily (77) consumption recorders for statistical reasons and in order to display the consumption on the "Communicator" (1) screen FIG. 2a, FIG. 2b.

When the pulses recorded reach the preset limit (78), the system checks whether any of the sensors (79) are active. The system also receives a command from the hot water sensor (50) and the irrigation sensor (51) and decides to reset the quantity restriction meter (86), if and when the sensors are not active (79) and the system has reached the number of preset pulses, of a predetermined quantity of product consumption, then activates the relay (80) and monitors the readings of the pressure sensor (81). If the pressure sensor is equalised, because the user has turned off the supply switches, the system deactivates (82) the electrically activated water valve (48), resets the counter (83) and returns to the standby mode (73).

Figure 7:
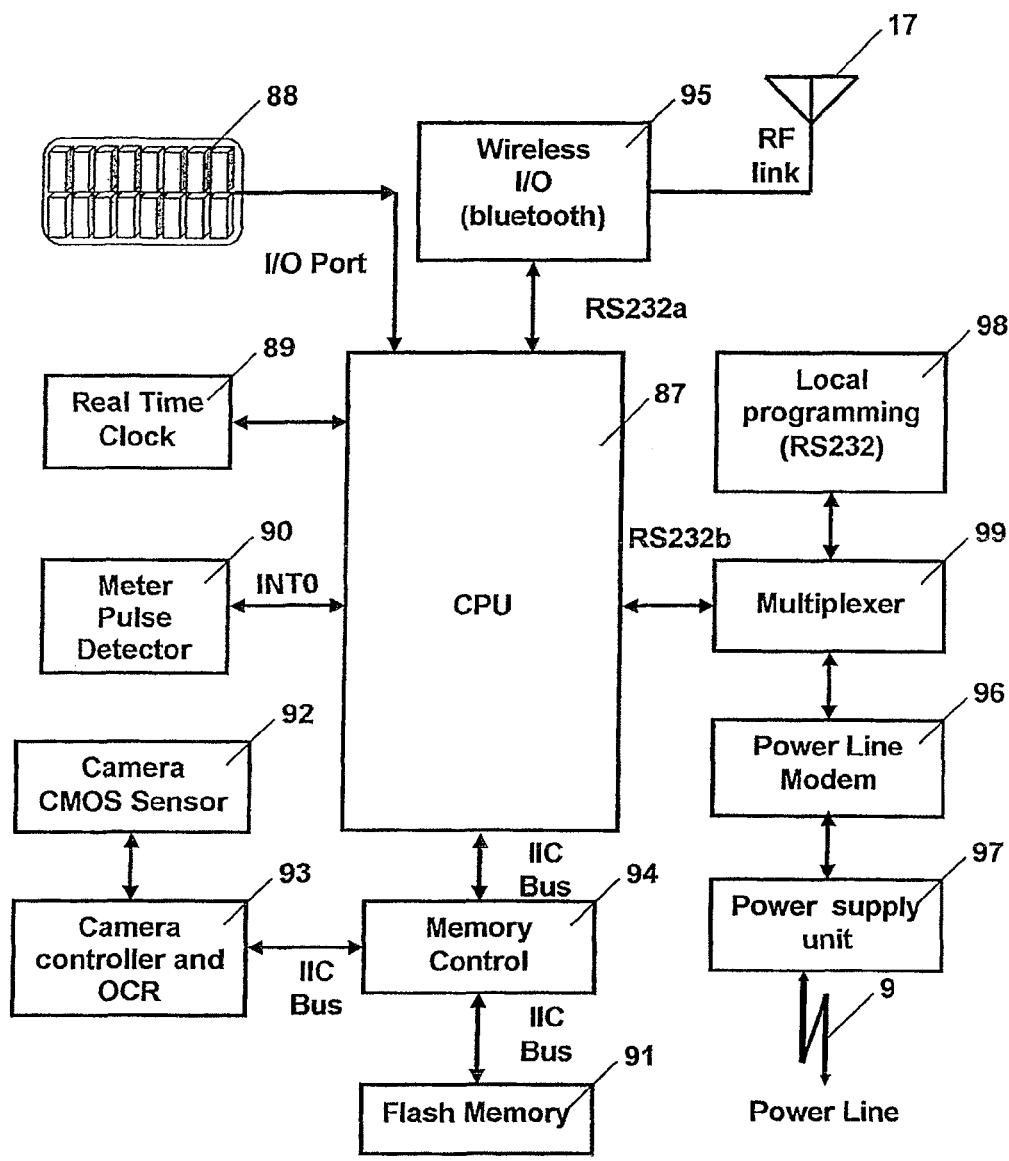
FIG. 7: Indicative, typical block diagram for the different components of the communication circuit meter (client) (55) installed.

FIG. 7: The client's communication circuit (55) is Illustrated in FIG. 7 presenting a block diagram of the microprocessor (CPU) (87) which disposes of two RS232 communication channels. The client's communication circuit (55) may send the data, either directly or through an adjacent client communication circuit (55) to a Host—"Communicator" (1). Each client communication circuit (55) disposes of dip switches (88) that determine its identity, as well as the type of the available metering system. In this way, it is possible to connect multiple clients communications circuits (55) with the same host—"Communicator" (1). Each client communication circuit (55) disposes of a Real time clock (89) system, which is synchronised by the host—"Communicator" (1). The Real time dock system (89) produces all the synchronisation signals required for the operation of the client communication circuit (55).

Each client communication circuit (55) has the ability to detect the pulses originating with metering systems (optical pulses, Hall effect sensor pulses, electric pulses from relays, electronic consumption meters, etc.). The pulses are transformed into TTL at the pulse detection system (90), where they produce an interrupt (INT0) that is detectable by the CPU.

The pulses coming from the meter are registered in a memory system (EEPROM-Flash memory) (91), which maintains the data even in case of power failure. The same memory may accept input from a photographic system of a mechanical meter (92) with a CCD or a CMOS sensor. The photographic system disposes of a control and optical recognition circuit (OCR) (93) of the meter reading. The management of the system's memory is carried out by a multiplexer (94) controlled either directly by the CPU, or by means of the IIC communication channel.

The information recorded in the memory is either accompanied by a record of the precise time of metering, or is sent at fixed intervals to a host—"Communicator" (1) or another client communication circuit (55), by means of a radio connection (95) (RF-bluetooth), or through a Power Line Modem (PLM) (96). The PLM uses the system's power supply equipment (97) in order to send information to the electric power consumption network (9).

The initial programming and the subsequent modification of the operation parameters of the client communication circuit (55), may be effected through local programming from a terminal (98) (e.g. a portable computer), with manual (switches) or automatic (signal detection by the terminal) multiplexing of one of the two RS232 channels of the CPU (99).

Figure 8:
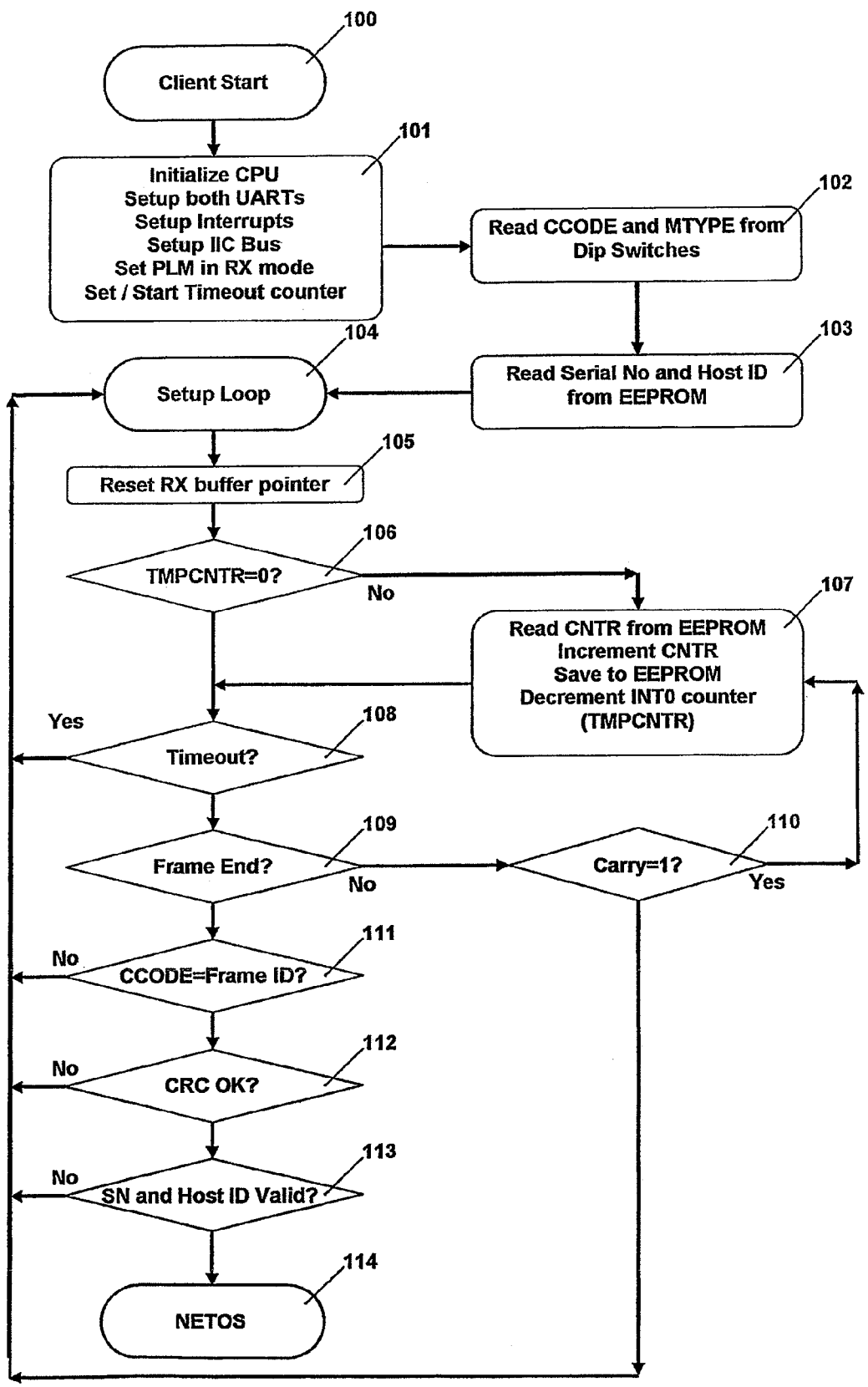
FIG. 8: Flow chart diagram of the meter communication circuit (55).

FIG. 8: Illustration of a typical flow chart of the communication circuit of the meter (55).

Upon starting of the client's CPU (100)—voltage application or external reset-(101):

Initialisation of the communication channels (UART) of the device.

Determination of system interrupts and the respective level of priority.

Specification of I/O pins to be used for communication and memory control (FIG. 7-94) with the IIC protocol.

The Power Line Modem (PLM) is set on receiving mode,

Specification and initialisation of synchronisation pulse production systems (timers, timeout counters, baud rate generators).

Subsequently, the CPU reads the system identity and the meter type from the dip switches (FIG. 7-88) (102), as well as the serial number and the host identity (103) recorded in the system's memory (FIG. 7-91). In this way, every piece of information exchanged by the system, will include both the identity of the sender as well as the identity of the recipient.

At this point (104), the program executes the main loop: Processes (105-110) describe the receiving process of a frame, which is the fixed length Information received by the host (1) or by another client system (55). The receipt of each frame has to be carried out within a fixed and preset time, specified by the timeout parameter (108). When the receipt of information is successful, the systems checks the following:
  if the information is intended for the specific client (111).
  If data transmission is error free (112), and finally
  if the sender of the information belongs to the list of senders serviced by the client (113).

If all the above conditions are satisfied, the system proceeds with information processing (114). If not, the information is neglected and the loop is repeated (104).

Figure 8A:
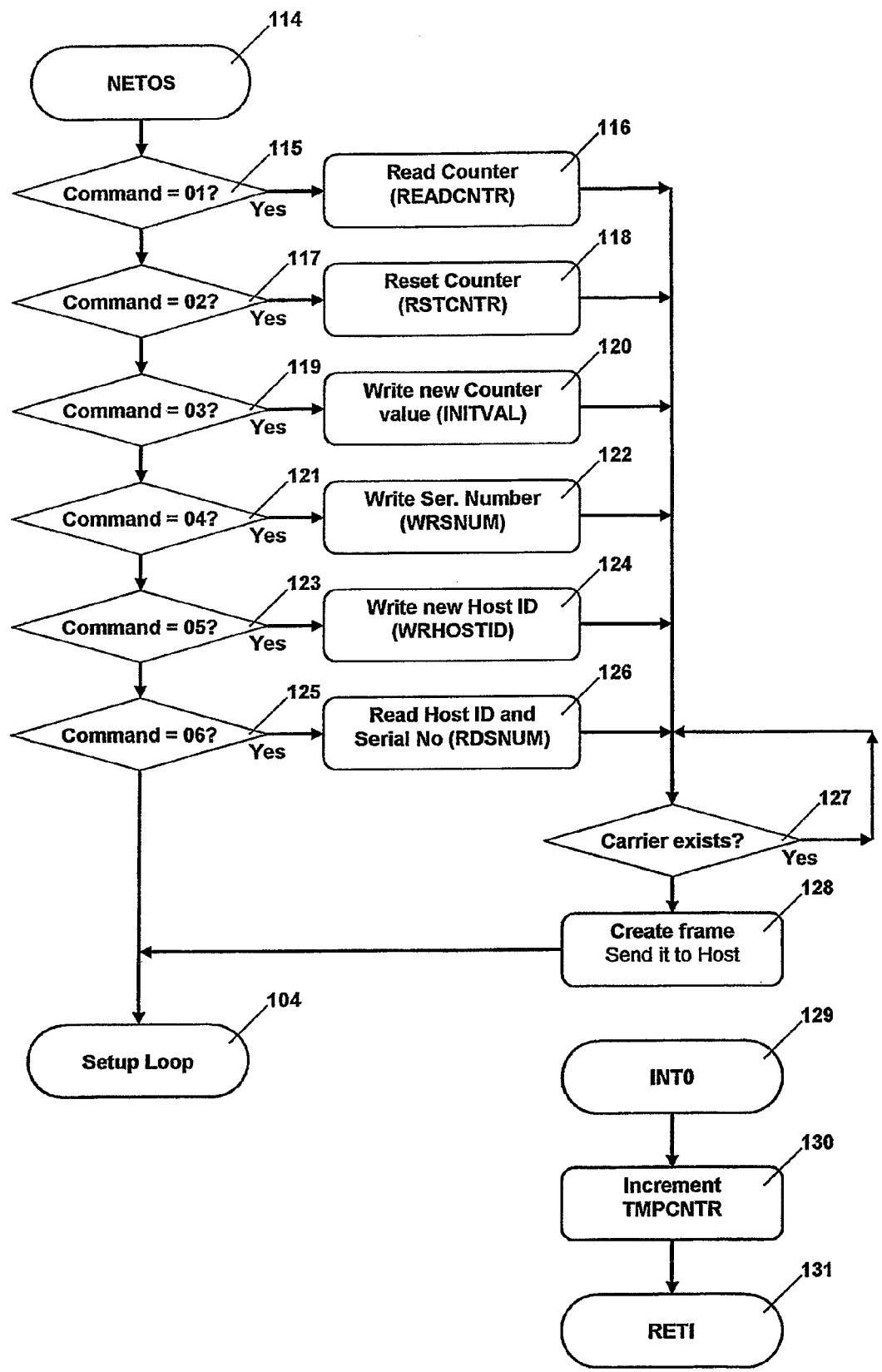

FIG. 8*a*: Description of the sequence of the flow chart, according to which all the information received, is decoded by the system (114) and routed by means of a dynamic lookup table to simple system routines performing specific functions, such as e.g.:
  Meter reading (116).
  Meter resetting (118).
  Meter initialisation (120).
  Initalisation of serial number (122).
  Change of host or addition of serviced client (124).
  Receipt of operation status information (126), etc.

Following the completion of the operation, the system waits for the detection of an open communication channel with the information sender (127), creates the response frame, sends the function execution confirmation (128) and returns to the beginning of the loop (104).

The receipt of the consumption information is always serviced by the creation of an interrupt (129-131), that either issues the command to increase the reading by a number of units (CNTR=CNTR+TMP.C.NTR—(130, 107)), when the interrupt is immediate (FIG. 7-90), or directly replaces the CNTR value (if coming from the photographic system (FIG. 7-93) or some other serviced system (FIG. 7-95 or FIG. 7-98)).

Figure 9:
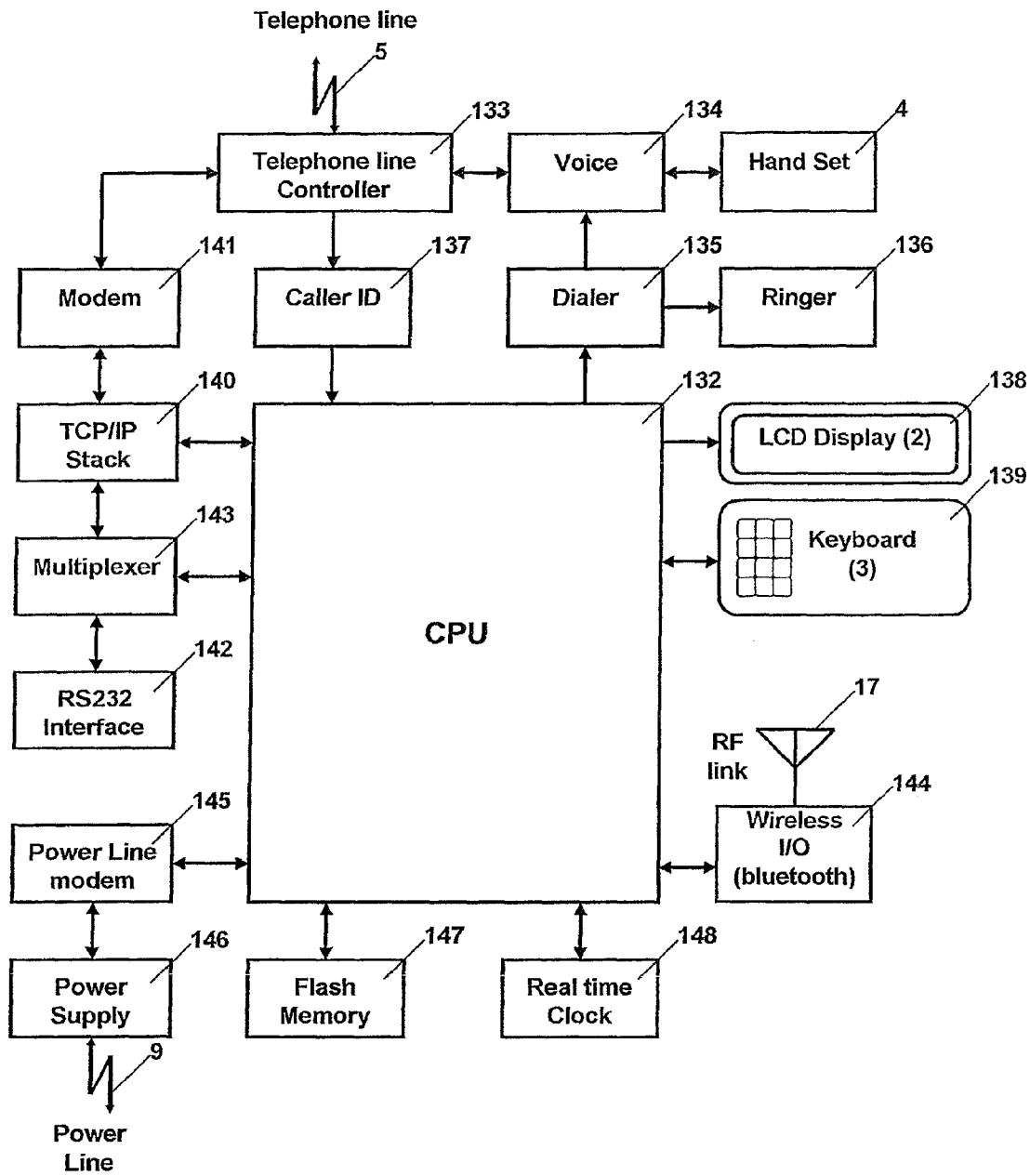
FIG. 9: Indicative, typical block diagram of the "Communicator" (1) (Host).

FIG. 9: Illustration of a block diagram of the "Communicator" connection (1). Indicatively, and solely for the purposes of the example under discussion, the Host system is a "smart" telephone device, controlled by a processing unit (CPU) (132). The CPU directly controls the conventional functions of the telephone device, however it may be connected to the Internet and also communicate with the client systems, both by means of a PLM as well as by means of a radio connection (Bluetooth or RF).

The conventional part of the device consists of an adaptor/controller (133) of the telephone line (5), performing the following functions:
  Separation of sound signals and control of the telephone receiver (4) by means of a voice amplifier (134).
  Collection of information by the caller ID system (137) and synchronisation of the system's Real time dock (148) with the official time.
  Dialer (135) call pulse transmission.
  Notification of the CPU with regards to the status of the line (occupied or not and presence of sound signal, so that the CPU may produce the appropriate pulse (ringer) (136)).

The CPU also controls
  A liquid crystal (138) display (2) presenting the time or commercial messages or even consumption readings—messages to the user (FIG. 2*a*-FIG. 2*f*).
  The keypad (3) of the system (139), through which the telephone call is being effected along with the user notification requests with the use of the function keys (6).

Connection to the Internet is effected automatically, with the help of a conventional modem (141), supplied by an integrated IC (iChip), comprising a complete TCP/IP stack (140) controlled either by the CPU or by a local RS232 channel (142) through a multiplexer (143) or simple switches that are also used for the initial programming of the system.

Communication with the client systems may be carried out either by radio connection (RF, Bluetooth) (144) or through a power line (9) of the power supply equipment of the system (146) and a Power Line Modem (145).

The data coming from one or more clients communications circuits (55) that are going to be sent (eData), are stored in a Flash memory/EEPROM (147) that preserves the data stored even in case of power failure.

The Real Time Clock of the system (148) is used for the production of the synchronisation pulses of the entire device.

Figure 10:
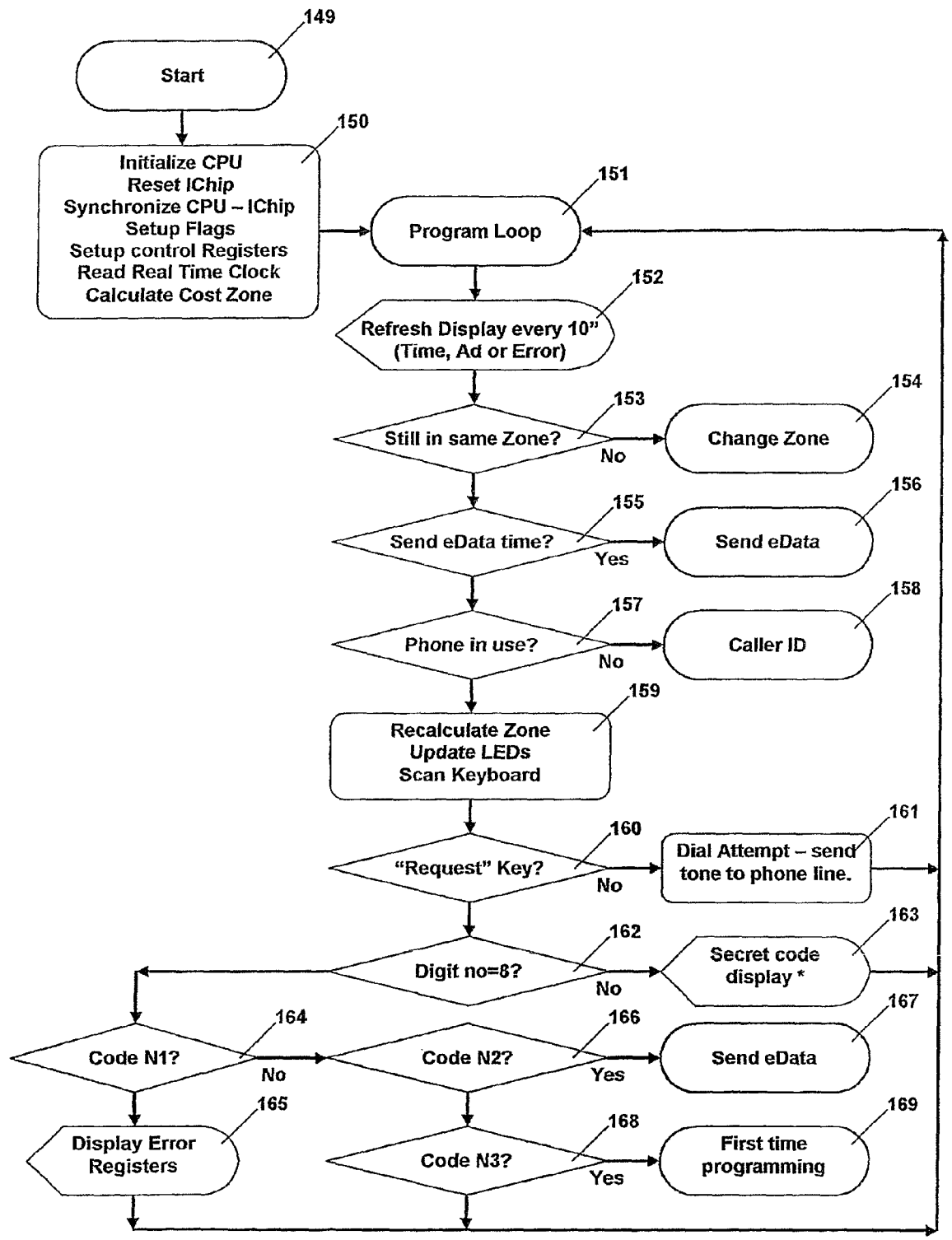
FIG. 10: Typical flow-chart diagram of the "Communicator" (1) (Host).

FIG. 10: Illustration of a typical flow chart of the "Communicator" (1).

The following operations (150) are carried out upon activation of the system (149) (voltage application or external reset):
  Initialisation of the CPU (132).
  Initialisation of the iChip (140) and synchronisation with the CPU.
  Initialisation of operational parameters and internal variables of the system.
  Receipt of time information by the Real Time Clock and calculation of the consumption charging zone.

Subsequently, the program enters the main loop of Operation (151).

The imaging routine (152), that refreshes the display (2) (138) of the device, and brings up information related to the time, Caller ID, commercials, user requests or system messages (FIG. 2*a*-FIG. 2*f*) is executed at fixed intervals (in the order of 10 sec).

Within the main loop, the program checks the following:
  If there is a change in the charging zone (153), in which case the zone change routine (154) is executed,
  If there are data that need to be sent (155), in which case the data sending routine (156) is executed.
  If data from the Caller ID (157) may be read, in which case the ID reading routine (158) is executed.
  If a key has been pressed by the user (160), in which case the appropriate pulse (161) is transmitted to the telephone line.
  If a key has been pressed associated with some sort of information request (function key) (6). In this case, the key is decoded (162, 164, 166, 168) and the system responds, either by displaying the error registers of the system (165), or by sending data to the Internet (167), or be entering into the initial programming phase (169).

Figure 10A:
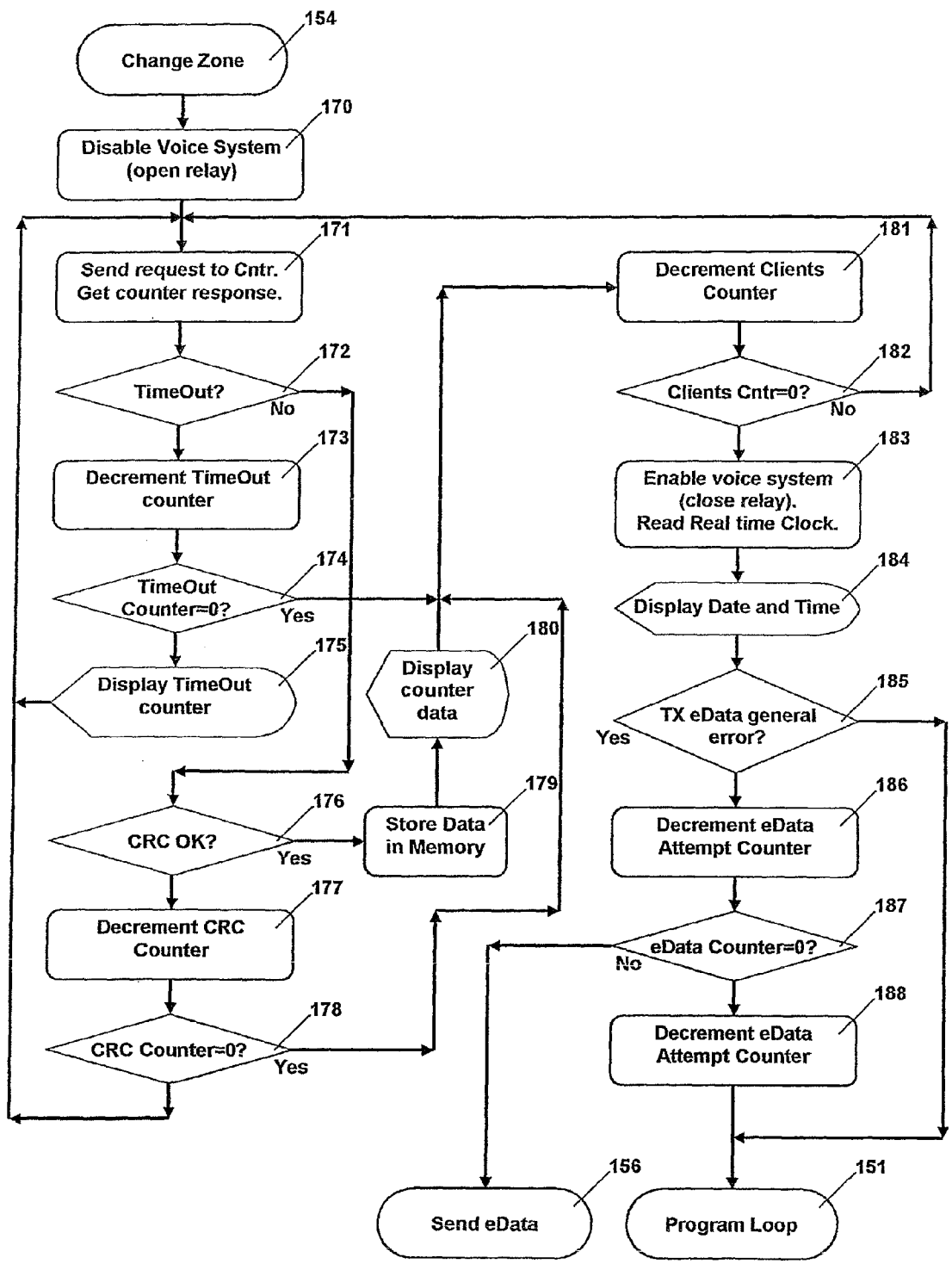

In the charging zone change routine (154), the program deactivates the system's voice system (170-FIG. 10*a*) and reads the meters (171) of all the clients serviced (181, 182).

On condition that there is no timeout (172, 173, 174, 175) or any transmission error (176, 177, 178), the reading (total consumption of client for the zone that ended) is registered to the system's memory (179) and displayed on screen (180).

In case of error, then the error (175) is displayed and the measurement is read later. After the completion of the process, the program reactivates the voice system (183), reads and displays the time (184). The data are then sent in the form of eData (156) to the master server of the system (185, 186, 187, 188), whereas repetition of the sending process is anticipated (eData Counter at preset number of repetitions) in case of error during the transmission.

Figure 10B:
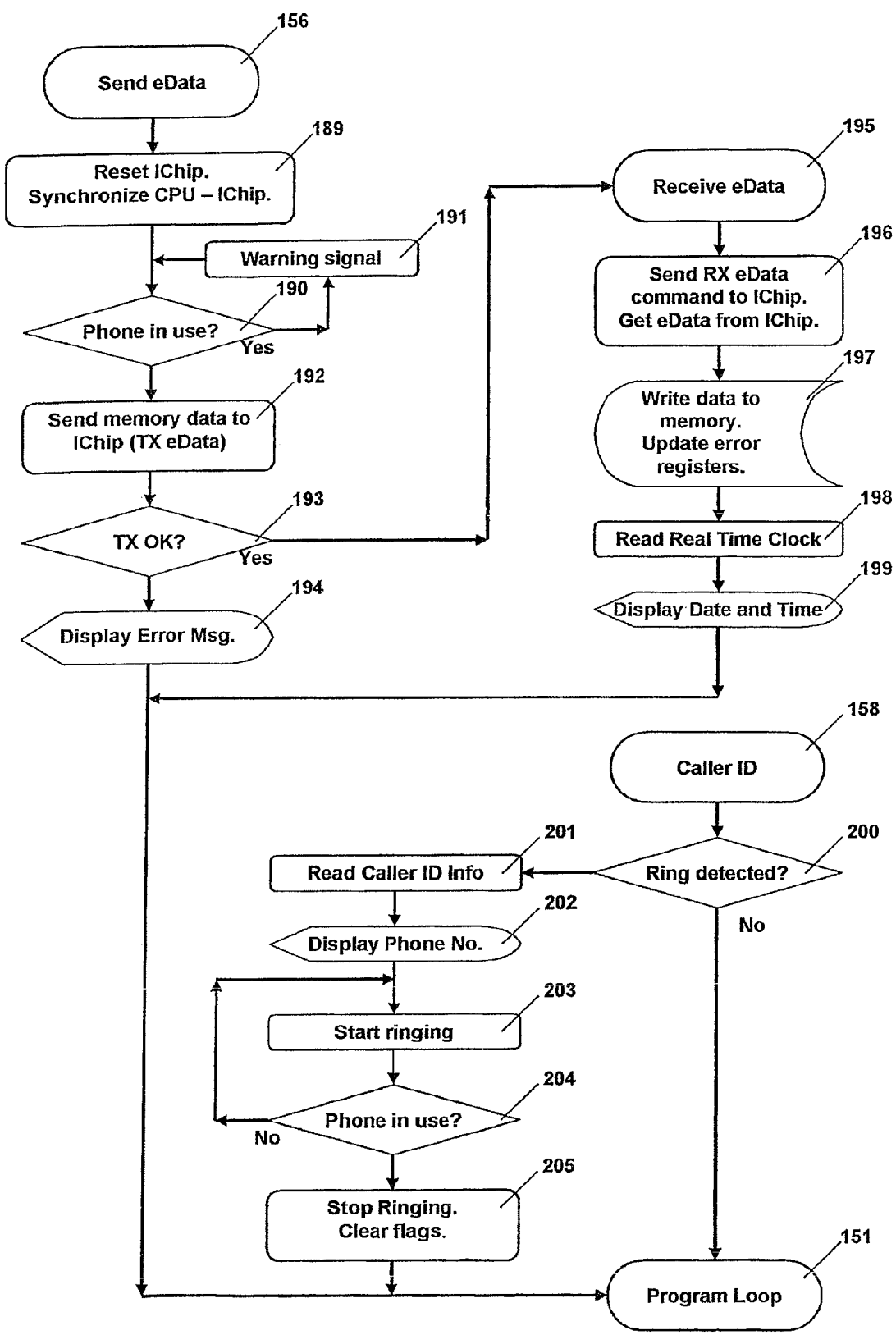

The data sending routine (156) starts with the synchronisation of the TCP/IP stack—IChip (FIG. 10*b*-189). If the telephone is not being used (190, 191), the CPU sends the consumption data to the iChip (192) which undertakes the task of sending the data to the server (32). In case of failure, the transmission is temporarily cancelled, and an error message (194) is displayed. If the iChip rules that transmission was carried out properly, the program runs the receipt routine (195), by sending the RX eDATA command to the iChip. The data received (196) are recorded to the memory, whereas potential errors are updated in the system's (197) error registers.

The Caller ID data reading routine (158) is executed each time the system detects a ringing pulse in the telephone line (200). Aside from the profound use associated with the display of the caller number (202) and the generation of the ringer sound (203, 204, 205), the Caller ID data reading routine (201) is also used by the system for the control and synchronisation of the Real Time Clock.

The invention claimed is:

1. A method of remote management of products and services, comprising:
    installing at least one sensor and first microprocessor in or near at least one consumption metering device;
    collecting readings from the at least one sensor installed on the at least one metering device at fixed time intervals and storing the readings in a coded format in the first microprocessor;
    transmitting the collected and coded readings from the first microprocessor to a communication unit having a second microprocessor installed in or near property of a consumer;
    receiving, decoding, processing, and storing the readings from the at least one sensor and first microprocessor in the communication unit having the second microprocessor;
    transmitting information processed by the communication unit to at least one communication center;
    receiving, processing, and storing the information from multiple communication units of multiple users-consumers in the at least one communication center;
    creating consumption curves or kilowatt hour sale prices in effect at any given time in the at least one communication center, based on the information from one or multiple communication units; and
    transmitting the consumption curves or kilowatt hour sales prices to individual communication units,
    wherein the information collected from the at least one sensor is processed on the basis of time, leading to the creation of more than one charging zones,
    wherein a product or service providing company may automatically interrupt the supply of services and products to the consumer-user through communication with the communication unit, and
    wherein the communication unit displays the current kilowatt hour sales price communicated from the at least one communication center at any given time.

2. The method as claimed in claim 1, wherein the at least one metering device is an electric power meter.

3. The method as claimed in claim 2, wherein the at least one sensor is an electric pulse sensor.

4. The method as claimed in claim 3, wherein the electric pulse sensor is installed in the interior of the at least one meter.

5. The method as claimed in claim 3, wherein the electric pulse sensor is installed on the exterior of the at least one meter.

6. The method as claimed in claim 2, wherein the at least one sensor has optical means for direct reading of the mechanical indications such as a display-panel of the power meter.

7. The method as claimed in claim 1, wherein the at least one metering device is a water measuring meter.

8. The method as claimed in claim 7, wherein the at least one sensor has optical means for direct reading of mechanical indications of the water meter.

9. The method as claimed in claim 7, wherein the communication unit, or the communication center of a water supply company through the communication unit, may restrict the consumption of water by a set number of product volume units for protection against excessive consumption or uncontrolled leak at the premises of the consumer-user.

10. The method as claimed in claim 1, wherein the at least one metering device is a gas meter.

11. The method as claimed in claim 10, wherein the at least one sensor has optical means for direct reading of mechanical indications of the gas.

12. The method as claimed in claim 1, wherein the at least one metering device is a heating meter.

13. The method as claimed in claim 12, wherein the at least one sensor has optical means for direct reading of mechanical indications of the heating meter.

14. The method as claimed in claim 1, wherein the information collected by the at least one sensor is transmitted from the meter to the communication unit through power transfer lines.

15. The method as claimed in claim 1, wherein the data from the at least one sensor is transmitted by means of radio communication to the communication unit.

16. The method as claimed in claim 1, wherein the data from the at least one sensor is transmitted through the communication unit to the communication center of a provider of the products or services through the Internet.

17. The method as claimed in claim 1, wherein the data from the at least one sensor is transmitted through the communication unit to the communication center of a provider of the products or services through a simple telephone line.

18. The method as claimed in claim 1, wherein the data from the at least one sensor is transmitted through the communication unit to the communication center of a provider of the products or services through cellular mobile telephony.

19. The method as claimed in claim 1, wherein a consumption curve is created and transmitted from the communication center of a provider of the products or services to the communication unit or communication center of a user-consumer.

20. The method as claimed in claim 1, wherein a consumer-user is able to settle invoices with the communication center of a provider of the products and services through the communication unit.

21. The method as claimed in claim 1, wherein a consumer-user may express his opinion that has been requested, through the communication unit to the communication center of a provider of the products and services.

22. The method as claimed in claim 1, wherein the interrupted service or product refers to the acquisition of electric power by the consumer-user.

23. The method as claimed in claim 22, wherein the service or product providing company may reconnect the consumer-user and restore the supply of products and services through communication with the communication unit.

24. The method as claimed in claim 1, wherein the product or service providing company is a natural gas supply company and the interrupted supply is the natural gas supply.

25. The method as claimed in claim 24, wherein the natural gas supply company is able to reconnect the consumer-user to the system through communication with the communication unit.

26. The method as claimed in claim 24, wherein the interruption of supply is for safety reasons.

27. The method as claimed in claim 26, wherein the natural gas supply company is able to reconnect the consumer-user to the system through communication with the communication unit.

28. The method as claimed in claim 26, wherein the safety reasons include presence of a leak or uncontrolled consumption.

29. The method as claimed in claim 1, wherein the product or service providing company is a water supply company and the interrupted supply is the water supply, and wherein the interruption can be for technical reasons associated with exploitation and financial management.

30. The method as claimed in claim 29, wherein the water supply company may reconnect and restore the supply to the consumer-user through communication with the communication unit.

31. The method as claimed in claim 29, wherein the interruption is for reasons of safety.

32. The method as claimed in claim 31, wherein the water supplying company may restore the supply to the consumer-user that was interrupted for safety reasons through communication with the communication unit.

33. The method as claimed in claim 31, wherein the reasons of safety include uncontrolled consumption.

34. The method as claimed in claim 1, wherein the at least one sensor has optical means for direct reading of the at least one meter and is installed in the interior of the at least one meter.

35. The method as claimed in claim 1, wherein the at least one sensor has optical means for direct reading of the at least one meter and is installed on the exterior of the at least one meter.

36. The method as claimed in claim 1, wherein the communication unit of the consumer-user receives consumption related information from the at least one meter, with the use of pulse generating means that are installed in the interior of the at least one meter and are supplied by means of external contacts of special design and construction.

37. The method as claimed in claim 1, wherein data is transmitted between the at least one sensor and the communication unit by means of power line carrier transmission to the electric power transfer lines of the consumer-user.

38. The method as claimed in claim 1, wherein data is transmitted between the at least one sensor and the communication unit by means of radio electromagnetic communication.

39. The method as claimed in claim 1, wherein data is transmitted between the at least one sensor and the communication unit by microwaves.

40. The method as claimed in claim 1, wherein data is transmitted between the communication unit and sensors in other meters with the exception of electric power meters by means of radio electromagnetic communication.

41. The method as claimed in claim 1, wherein data is transmitted between the communication unit and the consumer's meter, which is installed at a different electric power supply phase, by means of microwaves.

42. The method as claimed in claim 1, wherein data is transmitted between the communication unit and the consumer's meter, which is installed at a different electric power supply phase, by means of electromagnetic communication.

43. The method as claimed in claim 1, wherein data is transmitted between the communication unit and other meters with the exception of electric power meters by means of microwaves.

44. The method as claimed in claim 1, wherein many different sensors send data to be processed by one communication unit.

45. The method as claimed in claim 44, wherein the one communication unit services more than one consumers-users.

46. The method as claimed in claim 44, wherein the one communication unit comprises software required in order to service multiple users.

47. The method as claimed in claim 44, wherein the one communication unit issues invoice settlement collections.

48. A method of remote management of products and services, comprising:
   installing at least one sensor and first microprocessor in or near at least one consumption metering device;
   collecting readings from the at least one sensor installed on the at least one metering device at fixed time intervals and storing the readings in a coded format in the first microprocessor;
   transmitting the collected and coded readings from the first microprocessor to a communication unit having a second microprocessor installed in or near property of a consumer;
   receiving, decoding, processing, and storing the readings from the at least one sensor and microprocessor in the communication unit having the second microprocessor;
   transmitting information processed by the communication unit to at least one communication center;
   receiving, processing, and storing the information from multiple communication units of multiple users-consumers in the at least one communication center;
   creating consumption curves or kilowatt hour sale prices in effect at any given time in the at least one communication center, based on the information from one or multiple communication units; and
   transmitting the consumption curves or kilowatt hour sales prices to individual communication units,
   wherein the communication center of a service providing company comprises software required in order to undertake and process information received from the communication unit,
   wherein a product or service providing company may interrupt the supply of services and products to the consumer-user through communication with the communication unit, and
   wherein the communication unit displays the current kilowatt hour sales price communicated from the at least one communication center at any given time.

49. The method as claimed in claim 48, wherein the communication center further comprises software required for the registration and storing of information from the communication unit of the consumer-user.

50. The method as claimed in claim 48, wherein the communication center further comprises software and means required for sending messages to the communication unit of users-consumers regarding the settlement of obligations.

51. The method as claimed in claim 48, wherein the communication center further comprises software and means required for sending promotion material to the communication unit of users-consumers.

52. The method as claimed in claim 48, wherein the communication center further comprises software and means required for sending poll messages to the communication unit of users-consumers.

53. The method as claimed in claim 48, wherein the communication center further comprises software and means required for sending commands and messages to a group of communication units of users-consumers.

54. The method as claimed in claim 48, wherein the communication center further comprises software and means required for sending price updates to the communication unit of users-consumers.

55. The method as claimed in claim 48, wherein the communication center further comprises software and means required for sending product and service supply interruption orders to the communication unit of users-consumers.

56. The method as claimed in claim 48, wherein the communication center further comprises software and means required for sending supply reconnection orders to the communication unit of users-consumers.

57. The method as claimed in claim 48, wherein the communication center further comprises software and means required for sending fuel change orders to the communication unit of users-consumers under special contract.

58. The method as claimed in claim 48, wherein the communication center further comprises software and means required for accepting customer invoice payments for the supply of electric power from the communication unit of users-consumers.

59. The method as claimed in claim 48, wherein the communication center further comprises software and means required for accepting customer invoice payments for the water supply from the communication unit of users-consumers.

60. The method as claimed in claim 48, wherein the communication center further comprises software and means required for accepting customer invoice payments for the supply of gas from the communication unit of users-consumers.

61. The method as claimed in claim 48, wherein the communication center further comprises software and means required for accepting customer invoice payments for the supply of heating services from the communication unit of users-consumers.

62. The method as claimed in claim 48, wherein the communication center further comprises software and means required for accepting product transaction orders from the communication unit of users-consumers.

63. The method as claimed in claim 48, wherein the communication center further comprises software and means required for processing data with a plotter in order to draft the consumption curves of users-consumers.

64. The method as claimed in claim 48, wherein the communication center further comprises software and means required for processing data with a plotter and the means required for sending this information to the communication unit or communication center of users-consumers.

65. A system comprising:
at least one sensor and first microprocessor in or near at least one consumption metering device comprising means for collecting readings from the meter at fixed time intervals~and means for storing the readings in a coded format in the microprocessor;
means for transmitting the collected and coded readings from the first microprocessor to a communication unit having a second microprocessor;
a communication unit having the second microprocessor, in or near the location in which the at least one metering device is measuring consumption, comprising means for receiving, decoding, processing, and storing the readings from the at least one sensor and first microprocessor, means for transmitting information processed by the communication unit to at least one communication center, means for receiving consumption curves or kilowatt hour sales prices at any given time from the at least one communication center, means for displaying the current kilowatt hour sales price communicated from the at last one communication center at any given time, and means for interrupting the supply of services and products to the consumer-user, if instructions are received for such an interruption from the communication center; and
the at least one communication center comprising means for receiving information from multiple communication units and means for creating and transmitting consumption curves or kilowatt hour sale prices in effect at any given time to individual communication units, means for transmitting the current kilowatt hour sales price to the communication unit for display, and means for creating and transmitting instructions to communication units to interrupt the supply of services and products to the consumer-user,
wherein the communication unit further comprises means for recognition of emergency conditions, means of classification thereof, and means for sending that recognition and classification data to the at least one communication center.

66. The system as claimed in claim 65, in which communication between the communication unit and the communication center of a product and service supplying company is through the Internet.

67. The system as claimed in claim 65, in which communication between the communication unit and the communication center of a product and service supplying company is through mobile telephony.

68. The system as claimed in claim 65, in which communication between the communication unit and the communication center of a product and service supplying company is through a simple telephone line.

69. The system as claimed in claim 65, in which the at least one meter is an electric power meter.

70. The system as claimed in claim 65, in which the at least one meter is a water supply meter.

71. The system as claimed in claim 65, in which the at least one meter is a gas meter.

72. The system as claimed in claim 65, in which the at least one meter is a heating meter.

73. The system as claimed in claim 65, in which the means of communication between the communication unit and the at least one meter is the exchange of power line carrier signals at the electric power transfer lines of the consumer-user.

74. The system as claimed in claim 65, in which the means of communication between the communication unit and the at least one meter, is the exchange of microwaves.

75. The system as claimed in claim 65, in which the means of communication between the communication unit and the at least one meter, is effected by means of electromagnetic radio communication.

76. The system as claimed in claim 65, in which the means of communication between the communication unit and the at least one meter is in the form of digital data.

77. The system as claimed in claim 65, in which the means of communication between the communication unit and the at least one meter is in the form of digitized optical images.

78. The system as claimed in claim 77, in which the communication unit comprises an optical character recognition (OCR) software program for receiving digitized optical images and processing them.

79. The system as claimed in claim 65, further comprising means for communication between the communication unit and meters installed at different electric power supply phases.

80. The system as claimed in claim 65, wherein the communication unit further comprises means for sending to and receiving messages from more than one communication center.

81. The system as claimed in claim 65, wherein the system further comprises safety switches on the appliances to automatically change the amount of service or product received from the product or service providing company based on instructions from the product or service providing company transmitted from the communication center to the communication unit, which controls the safety switches.

* * * * *